United States Patent [19]

McRoberts, Jr. et al.

[11] Patent Number: 4,965,461
[45] Date of Patent: Oct. 23, 1990

[54] AUTOMATIC LIGHT-EXTINGUISHING CIRCUIT

[76] Inventors: George F. McRoberts, Jr., 16219-121st Ave. NE., Bothell, Wash. 98011; Thomas J. Moran, 10421 Tenth Pl. SE., Lake Stevens, Wash. 98258

[21] Appl. No.: 220,618

[22] Filed: Jul. 18, 1988

[51] Int. Cl.$^5$ .......................................... H01H 47/18
[52] U.S. Cl. ................................. 307/10.8; 307/10.7; 315/82; 315/83
[58] Field of Search ............ 307/10 R, 10 LS, 10 BP, 307/9; 315/82, 83, 78, 77; 340/52 F, 66, 6, 76, 86 F; 362/61

[56]  References Cited

U.S. PATENT DOCUMENTS

| | | | |
|---|---|---|---|
| 3,514,665 | 5/1970 | Chantstowich | 307/10 LS |
| 3,588,591 | 6/1971 | Harris | 315/82 X |
| 3,684,916 | 8/1972 | Skinner | 315/82 |
| 3,706,006 | 12/1972 | Miller | 315/83 |
| 3,963,941 | 6/1976 | Banker | 307/10 BP |

Primary Examiner—William M. Shoop, Jr.
Assistant Examiner—Paul Ip

Attorney, Agent, or Firm—Christensen, O'Connor, Johnson & Kindness

[57] ABSTRACT

An automatic light-extinguishing circuit (60) is disclosed for extinguishing, for example, the headlights (30) of an automobile some interval of time after the ignition switch (54) is opened. The circuit includes a temperature-actuated switch (72), switching relay (78), and diode (86). The heating element (74) of the temperature-actuated switch and a solenoid (80) of the switching relay are energized upon closure of the ignition switch, closing two normally open switch element (82 and 84). In this condition, current passes through the switch elements of the switching relay to the headlights and taillights. When the heating element causes the temperature of a switch element (76) to rise sufficiently, the switch element closes, forming an alternative path of current to the solenoid. When the ignition switch is opened, this path is maintained, ensuring continued flow of current to the headlights and taillights until the switch element cools sufficiently to open. The circuit is constructed for simplicity, economy, and substantially universal adaptability to existing vehicle electrical systems.

8 Claims, 6 Drawing Sheets

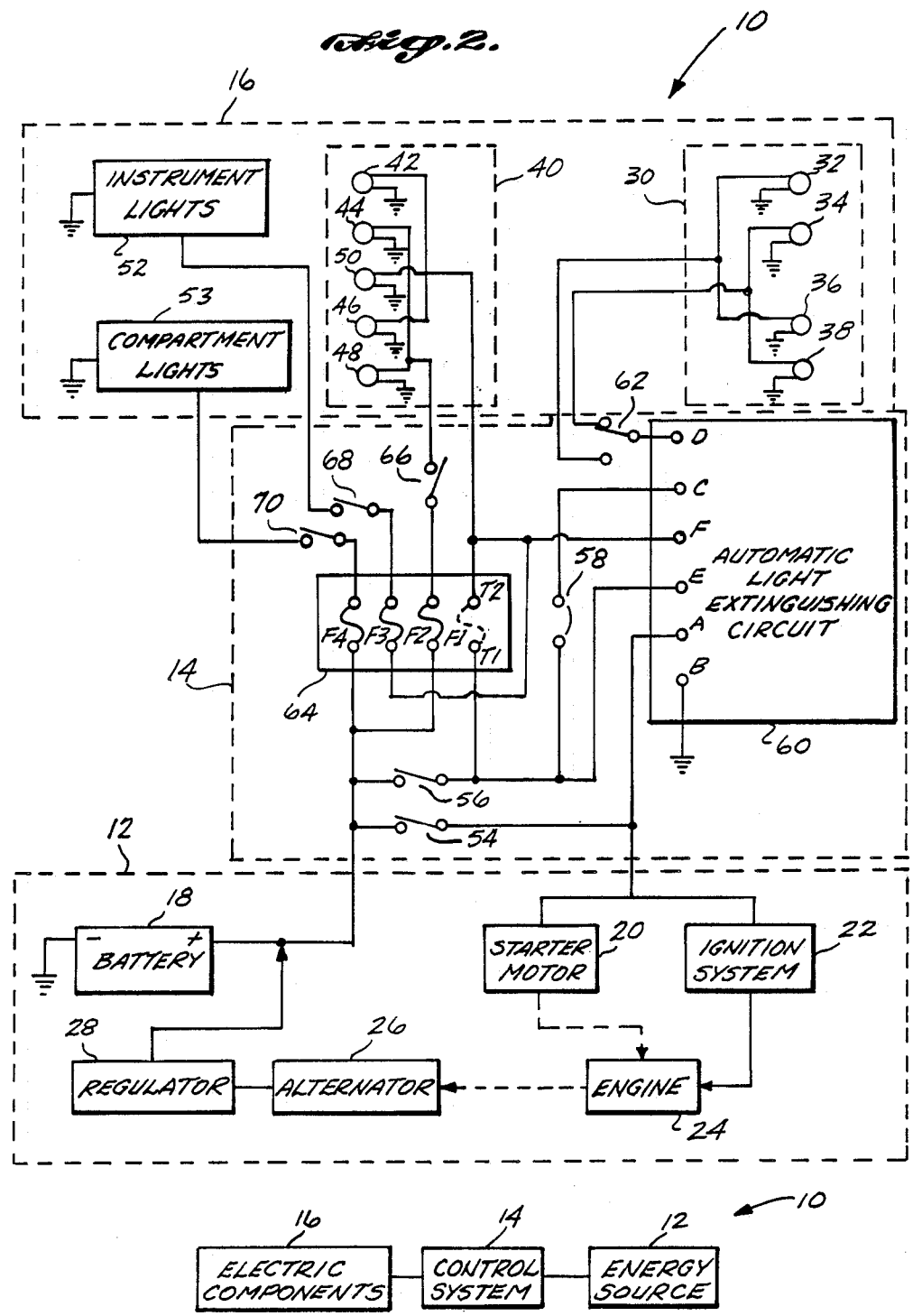

AUTOMATIC LIGHT-EXTINGUISHING CIRCUIT

FIELD OF THE INVENTION

This invention relates generally to vehicle lighting systems and, more particularly, to circuits for automatically extinguishing vehicle lights some interval of time after the vehicle is turned off.

BACKGROUND OF THE INVENTION

Conventional vehicle lighting systems typically employ a plurality of lights for various purposes. For example, headlights are used to illuminate the vehicle's path and make the vehicle visible to oncoming traffic at night and during adverse weather conditions. The headlights are selectively energized and deenergized in response to the operation of a main light switch. A dimmer switch, connected in series with this light switch, further allows "high" and "low" beam elements in the headlights to be selectively energized.

A group of lights, collectively known as taillights, are also under the control of the main switch. For example, parking lights are included to make the vehicle visible to traffic behind the vehicle, both when traveling and parked. Brakelights, which are further controlled by actuation of a switch coupled to the vehicle brake pedal, indicate braking of the vehicle. By intermittently energizing the driver side and passenger side taillights in response to, for example, a switch provided on the vehicle steering column, left and right turn signals are conventionally provided to indicate the operator's intent to turn the vehicle.

In addition to the headlights and taillights, most vehicles include a plurality of instrument lights to illuminate the various gauges, meters and indicators on the vehicle dashboard. Compartment lights, including a dome light, glove compartment light, storage compartment light and courtesy lights located at various points throughout the vehicle illuminate the vehicle compartments and typically respond to the operation of switches actuated, for example, by the opening of a car door.

In conventional lighting systems, energy is supplied to the various lights in the system by a DC storage battery. During operation of the vehicle, an alternator coupled to the vehicle engine provides energy to the battery, maintaining the battery in a "charged" condition adequate to ensure the continued operation of, for example, the vehicle lighting and ignition systems. Once the engine is turned off, however, the alternator no longer replenishes energy depleted from the battery by the lighting system. As a result, if the vehicle's lights remain energized for an extended interval of time after the engine is shut off, the battery may no longer be able to operate the engine starter, requiring the vehicle operator to replenish the energy drawn from the battery by, for example, electrically connecting the discharged battery to the battery of a running vehicle. As will be appreciated, this procedure is inconvenient at best.

To prevent the vehicle lighting system from inadvertently depleting the energy stored in the battery in this manner, various circuits have been developed. For example, some automobile electrical systems are equipped with devices that produce an audible alarm when the automobile's headlights remain on after the ignition switch is opened. This alarm prompts the automobile operator to extinguish the headlights or risk the discharge of the battery.

The use of an alarm, however, has several disadvantages. First, if the ambient noise level is high or the operator becomes distracted, it remains possible for the operator to inadvertently allow the battery to become discharged. Second, it may be desirable in some instances to automatically extinguish the headlights a short interval of time after the ignition switch is opened. For example, when the vehicle is driven into a dark parking area or garage, it may be useful to leave the lights on for an interval of time that is sufficient to allow the operator to exit the vehicle and enter an adjoining home.

As an alternative to the use of alarms, various circuits have been developed to automatically extinguish vehicle headlights some interval of time after the vehicle is shut off. For example, (Banker) U.S. Pat. No. 3,963,941 discloses the use of a thermally responsive switch in series with the ignition switch to control the flow of current to a vehicle's headlights. The thermally responsive switch includes a heater element and a two-position switch actuated by a bimetallic element. When the vehicle is started, the thermally responsive switch is in its first, or normal, position and current flows from the battery, through the ignition switch, to both the heater element and the series combination of the thermally responsive switch and headlights. As the temperature of the heater element rises, the bimetallic element eventually switches the thermally responsive switch to its second position. In this position, the flow of current to the headlights is no longer through the ignition switch. Thus, when the ignition switch is opened, current will continue to flow to the headlights. Because the heater element is deenergized, however, the bimetallic element will eventually open, interrupting the headlight circuit.

In (Miller, Sr.) U.S. Pat. No. 3,706,006 a headlight control system is disclosed that includes a solenoid-actuated relay and a thermal relay connected in parallel. The solenoid-actuated relay includes a solenoid and a normally open switch that closes when the solenoid is energized. Similarly, the thermal relay includes a bimetallic switch element that responds to the operation of a heating element. When the vehicle engine is started, current flows through the parallel connection of the thermal relay heater element and the solenoid of the other relay. The current to the headlights passes through the normally open switch closed by the solenoid. As the heating element warms, the bimetallic switch element forms an alternative current path to the headlights. When the engine is shut off, the bimetallic switch element maintains the auxiliary current path until it cools.

(Chaustowich) U.S. Pat. No. 3,514,665 discloses a delay switch circuit that includes a pair of solenoid-actuated, two-position switches and two thermally responsive switches. Upon closure of the vehicle's ignition switch, a first of the solenoid-actuated relays is energized, allowing current to flow through the heater elements of the two thermally responsive switches and through the contacts of the second solenoid-actuated relay to the headlights. As the temperature of a first of the heater elements increases, the associated normally open, thermally responsive switch closes, actuating the second relay. With the contacts of the second relay switched to their second position, energy is then provided to the headlights via the thermally responsive switch rather than the ignition switch. Thus, although the first relay will drop out when the ignition switch is turned off, limiting current to the heater elements, energy will continue to be provided to the headlights. Eventually, the temperature of the first heater element drops sufficiently to allow the contacts of the first thermally responsive switch to open, breaking the headlight circuit.

While these arrangements advantageously employ relatively widely available temperature-actuated switches to effect a delayed extinguishing of the lights, they suffer from several disadvantages. For example, both the Banker and Chaustowich arrangements briefly interrupt the headlight power circuit when the thermally responsive switch is actuated. As will be appreciated, such interruptions can have a deleterious impact on contact life. In addition, the circuit disclosed in the Chaustowich patent is relatively complex. Finally, the Banker and Miller, Sr. arrangements employ the thermally responsive switch, rather than the solenoid-actuated switch, to control the flow of current to the headlights.

In light of these observations, it would be desirable to provide a simple, inexpensive circuit that allows, for example, a vehicle's headlights to be automatically extinguished some interval of time after the vehicle is turned off. The circuit would preferably maintain a continuous flow of current to the headlights until the interval of time expires. Given the failure of most existing vehicle electrical systems to provide such circuits, it would further be desirable to provide a circuit that is easily installable in, or "universally" adaptable to, a wide variety of existing systems.

SUMMARY OF THE INVENTION

In accordance with this invention, a circuit is provided for use in a vehicle that includes a source of electric energy, electric components, and an ignition switch. The circuit is designed to connect the electric components to the source when the ignition switch is opened and automatically disconnect the electric components from the source an interval of time after the ignition switch is opened and comprises a control switch, a diode, and a relay. The control switch includes a heating element, connectable to the ignition switch, and a switch element. The relay includes a solenoid, connectable to the ignition switch by the diode and to the source of electric energy by the switch element of the control switch. A power switch element is also provided in the relay and is connectable between the source of electric energy and the lights. The solenoid can be energized to operate the power switch element and control the supply of energy to the lights. The diode provides energy to the solenoid upon closure of the ignition switch and the heating element can be energized to operate the control switch element.

In accordance with another aspect of this invention, the circuit is designed for connection into the electrical system of a vehicle that includes a source of electric energy coupled to an electric ground, a dimmer power wire coupled to headlights, a fuseblock with fuse-receiving device, an auxiliary electric device, and an ignition switch. The circuit is designed to connect the headlights and auxiliary electric device to the source when the ignition switch is closed and automatically disconnect the headlights and auxiliary electric device from the source an interval of time after the ignition switch is opened. The circuit includes a control switch, having a heating element and a control switch element that is responsive to the temperature of said heating element. The circuit further includes a diode and a relay, having a solenoid and a power switch element that is responsive to said solenoid. The heating element and diode are connected to define a first point that is connectable to the ignition switch. The heating element and solenoid are connected to define a second point that is connectable to ground. The power switch element defines third and fourth points that are connectable into the dimmer power wire. The control switch element is connected to the solenoid and diode and defines a fifth point connectable to the fuse-receiving device.

In accordance with a further aspect of this invention, the circuit includes a control system, having a temperature-actuated switch, solenoid, and diode, and a power system that is responsive to the operation of the temperature-actuated switch, solenoid, and diode. The power system is designed to connect and disconnect the headlights and is electromechanically coupled to the control system but substantially isolated therefrom electrically.

BRIEF DESCRIPTION OF THE DRAWINGS

The invention will presently be described in greater detail, by way of example, with reference to the accompanying drawings, wherein:

FIG. 1 is a block diagram of a vehicle electrical system;

FIG. 2 is a more detailed block diagram of the electrical system illustrated in FIG. 1;

DETAILED DESCRIPTION OF THE PREFERRED EMBODIMENT OF THE INVENTION

Figure 3:
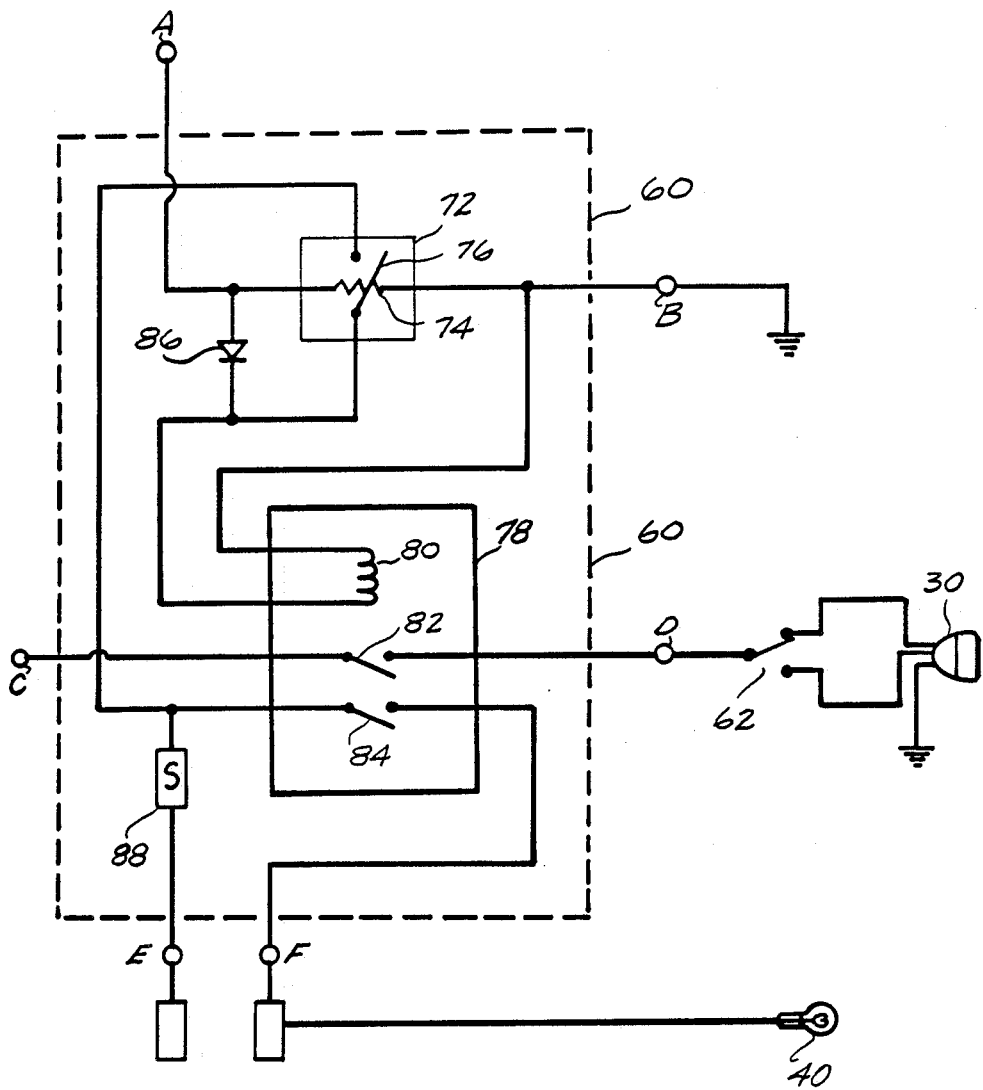
FIG. 3 is a schematic diagram of an automatic light-extinguishing circuit constructed in accordance with this invention and employed in the electrical system of FIGS. 1 and 2, at some time prior to the closure of the vehicle ignition switch.

Referring now to FIG. 1, a vehicle electrical system 10 is illustrated in block form. The electric energy required to operate system 10 is produced and stored by a source 12. A control system 14 transfers energy from source 12 to the various components 16 of system 10 to be operated.

Addressing the elements of system 10 in greater detail, reference is had to FIG. 2. In a standard automobile electrical system 10, the primary component of energy source 12 is a 12-volt DC storage battery 18. The battery 18, which includes a positive terminal and a negative terminal connected to the vehicle chassis or ground, receives energy from other components of source 12 and makes it available to the remainder of system 10. Source 12 also includes a DC starter motor 20, which is mechanically coupled to an automobile engine 24, and an ignition system 22, which is electrically coupled to the engine 24. As will be appreciated, the starter motor 20 and ignition system 22 cooperatively allow the engine 24 to be started and operated.

Engine 24 is, in turn, mechanically coupled to an alternator 26. The alternator 26 converts a portion of the mechanical energy developed by engine 24 into electric energy. A regulator 28 then controls the output of alternator 26 in response to demands placed upon the electrical system 10. The output of regulator 28 is applied to the positive terminal of battery 18, ensuring that sufficient energy is stored in battery 18 to operate system 10.

Reviewing the various electric components 16 of system 10, as shown in FIG. 2, the components 16 include a group of lights that can be collectively referred to as headlights 30. As will be appreciated, the headlights 30 are included to illuminate the vehicle path and to enhance the visibility of the vehicle to others during, for example, adverse weather conditions. The headlights 30 include a driver side high-beam element 32, driver side low-beam element 34, passenger side high-beam element 36, and passenger side low-beam element 38. These high- and low-beam elements 32, 34, 36 and 38 are provided to allow the automobile operator to selectively control the illumination pattern of the headlights 30 via the control system 14. Each of the elements includes a grounded terminal and a positive terminal, which is electrically connected to battery 18 by control system 14.

The electric components 16 also include a plurality of lights that can be collectively referred to as taillights 40. As shown in FIG. 2, these lights include a driver side parking light 42, a driver side brakelight 44, a passenger side parking light 46, a passenger side brakelight 48, and a license plate light 50. The function of parking lights 42 and 46 is to improve the visibility of the vehicle to people behind the vehicle at night or during adverse weather conditions. As will be appreciated, additional parking lights connected in parallel with lights 42 and 46 are typically included on the front end of the vehicle but are not illustrated in FIG. 2 for simplicity. Brakelights 44 and 48 indicate that the operator has actuated the vehicle brakes to effect a decrease in the vehicle's speed. The license plate light 50 is included to make the vehicle's license plate visible, for example, at night. As shown in FIG. 2, each of the taillights 40 includes a grounded terminal and a second terminal that is electrically connected to the positive terminal of battery 18 by control system 14.

The electric components 16 may also include instrument lights 52 and compartment lights 53, shown as single blocks in FIG. 2. The instrument lights 52, which typically illuminate a variety of instruments located in the vehicle dashboard, may include an instrument cluster illumination lamp, turn signal lamp, high-beam indicator lamp, brake indicator lamp, seat belt indicator lamp, oil pressure indicator lamp, generator indicator lamp, and temperature indicator lamp. The compartment lights 53 are employed to illuminate a variety of vehicle compartments and usually include a dome lamp, glove compartment lamp, luggage compartment lamp, and courtesy lamps. The instrument and compartment lights 52 and 53 are controlled through system 14. Although not illustrated in FIG. 2, electric components 16 may also include a variety of devices such as AM/FM radios, citizen band radios and telephones.

Turning now to a discussion of the control system 14, as shown in FIG. 2, it includes an ignition switch 54 that is actuated by the vehicle operator with the aid of a key. As will be appreciated, ignition switch 54 is typically of a rotary type having start/ignition, accessory/ignition, accessory and off positions. Rotation of the ignition switch 54 to the start/ignition position allows current to flow from the positive terminal of battery 18 to both the starter motor 20 and ignition system 22, causing the engine 24 to start. At that time, ignition switch 54 is rotated to the accessory/ignition position, which allows current to flow to the ignition system 22 and other components of system 10, but not starter motor 20. This enables engine 24 to continue operating without damage to the starter motor 20. Alternatively, ignition switch 54 can be rotated to the accessory position in which energy from battery 18 is made available to the components of system 10, excluding starter motor 20 and ignition system 22. As a result, the headlights 30, taillights 40, and other components of system 10 including, for example, a radio and telephone, can be operated without the engine 24 running. For simplicity of illustration, ignition switch 54 is depicted in FIG. 2 as comprising a single pole, single throw, normally open switch. It will be appreciated, however, that, in the ensuing discussion, the closure of this single switch can be considered representative of the ignition switch 54 having been moved to either the start/ignition, accessory/ignition or accessory position.

A normally open light switch 56 is also included in system 14 to allow the vehicle operator to energize and deenergize the headlights 30, taillights 40, and instrument lights 52. As shown in FIG. 2, one side of switch 56 is electrically coupled to the positive terminal of the battery 18. The other side of switch 56 is coupled to headlights 30 via the series combination of an overload protection device 58, an automatic light-extinguishing circuit 60, and a single-pole, double-throw dimmer switch 62. The overload protection device 58, which is connected between switch 56 and a terminal C of circuit 60, may be, for example, a circuit breaker or fuse designed to protect the headlight wiring from an overload current. The automatic light-extinguishing circuit 60 has terminals C and D connected to the overload protection device 58 and dimmer switch 62, respectively, and interrupts the flow of current to, for example, the headlights 30 some interval of time after the ignition switch 54 is opened. The dimmer switch 62 has three leads, with the main power lead being connected to terminal D of circuit 60 and the other two leads connected to the high-beam elements 32 and 36 and the low-beam elements 34 and 38, respectively. As will be appreciated, the dimmer switch 62 is selectively operable between first and second positions in which energy is directed to either the high-beam elements 32 and 36 or the low-beam elements 34 and 38.

As noted above, the light switch 56 also controls the flow of current to taillights 40 and instrument lights 52. More particularly, the side of switch 56 coupled to overload protection device 58 is also connected to terminal T1 of a fuseblock 64 and to circuit 60. Normally, the terminal T1 of fuseblock 64 would be electrically coupled to a second terminal T2 by a fuse F1. In the arrangement illustrated, however, the fuse F1 (shown in broken line) is removed and terminals T1 and T2 are connected via terminals E and F of the automatic light-extinguishing circuit 60. The terminal T2 of fuseblock 64 is then electrically connected to the parking lights 42 and 46 and the license plate light 50.

Although light switch 56 is shown as a single pole, normally open switch in FIG. 2 for illustrative simplicity, as will be appreciated its design and location in electrical system 10 may vary. For example, switch 56 may be of a double-pole single-throw design, with the two poles separately controlling the flow of current to the headlights 30, and taillights 40. In addition, although switch 56 is shown located between battery 18 and fuseblock 64 in FIG. 2, it typically interrupts the taillight circuit at some point between fuseblock 64 and taillights 40.

In the arrangement shown in FIG. 2, control circuit 14 also governs the transfer of energy from battery 18 to the brakelights 44 and 48. More particularly, the series combination of a fuse F2 in fuseblock 64 and a normally open brakelight switch 66, conventionally actuated by depression of the vehicle brake pedal, connect brakelights 44 and 48 to the positive terminal of battery 18. Similarly, a fuse F3 in fuseblock 64, a normally open instrument light switch 68, and circuit 60 provide a series connection between the positive terminal of battery 18 and the instrument lights 52. Finally, the positive terminal of battery 18 is coupled to the compartment lights 53 by the series combination of at least one compartment light switch 70 and a fuse F4 in fuseblock 64. In conventional arrangements, the normally open compartment light switch 70 may be actuated by, for example, opening of the passenger compartment door, glove compartment door, trunk lid, or closure of a domelight switch. As will be appreciated, although the arrangement depicted in FIG. 2 employs a fuse block 64 with fuses for overload protection of the taillights 40, instrument lights 52, and compartment lights 53, any suitable alternative such as circuit breakers can be employed.

Addressing now the details of the automatic light-extinguishing circuit 60, as shown in FIG. 2 the circuit 60 includes six terminals designated A,B, C,D,E, and F. Terminal A is connected to one side of the ignition switch 54. Terminal B is connected to the vehicle ground and, hence, the negative terminal of battery 18. As noted previously, terminals C and D interrupt the wire supplying power to dimmer switch 62, with terminal C being connected to circuit breaker 58 and terminal D connected to the dimmer switch 62. Finally, terminals E and F are coupled to terminals T1 and T2, respectively, of fuseblock 64. The function of circuit 60 is to automatically interrupt the flow of current to, for example, the automobile headlights 30, parking lights 40, and instrument lights 52 some interval of time after the ignition switch 54 is opened, when the light switch 56 is left in its closed position.

As shown in FIG. 3, the automatic light-extinguishing circuit 60 includes a number of components. For example, a temperature-actuated switch 72, which includes a heating element 74 and a normally open switch element 76, is employed in circuit 60. The operation of switch element 76 is controlled in part by the heating element 74. More particularly, heating element 74 converts electric energy into thermal energy. Because the switch element 76 is located in close proximity to the heating element 74 and closes upon reaching some predetermined temperature, by controlling the electric energy provided to the heating element 74, the operation of switch element 76 can be regulated.

A normally open, double-pole, single-throw, switching relay 78 is also included in circuit 60. This relay 78 includes a solenoid 80 for establishing a magnetic field when an electric current is applied thereto. A pair of normally open switch elements 82 and 84, positioned in close proximity to solenoid 80, are also included and close in response to the establishment of a magnetic field by solenoid 80. As will be appreciated, a pair of normally open, single-pole, single-throw switching relays 78 (with the second shown in broken-lines in FIG. 4) having their solenoids connected in parallel, can be employed in place of the double-pole relay 78 depicted in the FIGURES.

Figure 4:
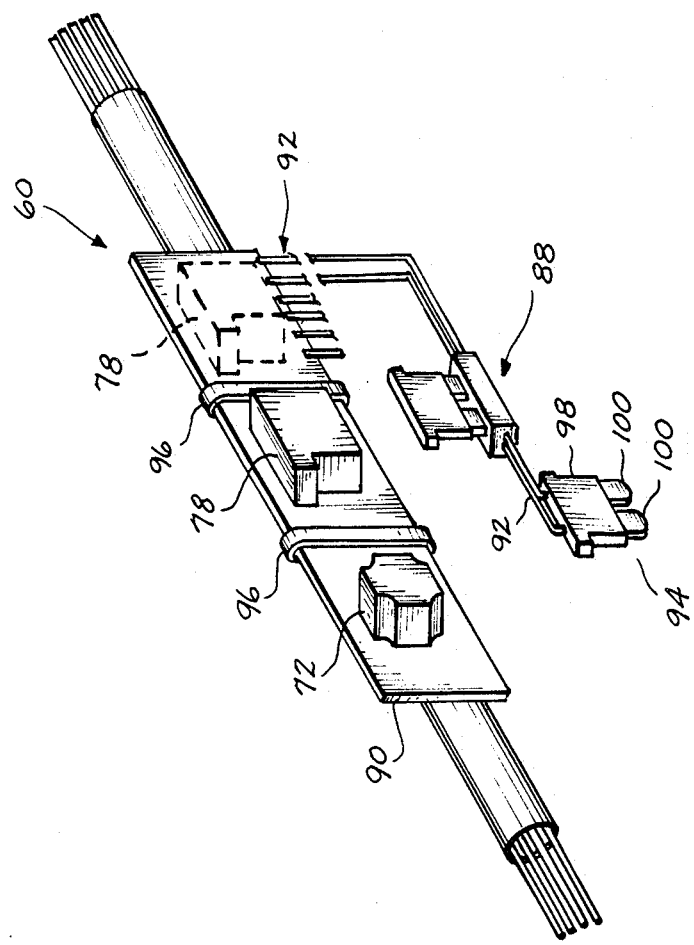
FIG. 4 is a pictorial view of the automatic light extinguishing circuit of FIG. 3.

In addition to these components, circuit 60 also includes a diode 86 and an in-line fuse-and-holder assembly 88. These various components of circuit 60 can be mounted on a printed circuit board 90 as shown in FIG. 4 or can be alternatively connected by a wire harness. Although this assembly can be enclosed within a housing (not shown), in the preferred arrangement, the circuit board 90 is left uncovered to dissipate the heat generated by the temperature actuated switch 72. A terminal block (not shown) could also be provided on the circuit board 90 to allow circuit 60 to be more easily connected into the vehicle electrical system 10, although in the preferred arrangement connection wires 92 are soldered directly to the circuit board 90. Finally, a dummy fuse insert 94 is included in circuit 60 for insertion between terminals T1 and T2 of fuseblock 64 in place of fuse F1.

Reviewing now the interconnection of the various components of circuit 60 described above, reference is again had to FIG. 3. As shown, the heating element 74 of temperature-actuated switch 72 is connected between the ignition switch 54 at terminal A of circuit 60 and the system ground at terminal B of circuit 60. One contact of the switch element 76 is connected to system ground at terminal B of circuit 60 via the solenoid 80 of the switching relay 78. The other contact switch element 76 is coupled to terminal E of circuit 60 by the fuse-and-holder assembly 88 and to terminal F of circuit 60 by the switch element 84 of switching relay 78.

The positive side of diode 86 is coupled to terminal A of circuit 60. The negative lead of diode 86, on the other hand, is coupled to the connection between the switch element 76 of the temperature-actuated switch 72 and the solenoid 80 of relay 78. The fuse-and-holder assembly 88 is coupled between terminal E of circuit 60 and the connection of the switch element 76 of temperature-actuated switch 72 and the switch element 84 of switching relay 78.

As shown in FIG. 3, the solenoid 80 of switching relay 78 is connected between the grounded terminal B of circuit 60 and the connection between diode 86 and the switch element 76 of temperature-actuated switch 72. The switch element 82 of relay 78 is connected between terminals C and D of circuit 60. Switch element 84, on the other hand, is coupled between terminal F and the connection between the fuse-and-holder assembly 88 and the switch element 76 of temperature-actuated switch 72.

Addressing now the operation of an automatic light-extinguishing circuit 60 constructed in the preceding manner, reference is had to FIGS. 3, 5, 6, and 7. These figures illustrate the sequential operation of circuit 60, but for simplicity do not include all of the elements of system 10. More particularly, only the connections to headlights 30, taillights 40, and dimmer switch 62 are shown, with the headlights 30 and taillights 40 represented as single units. The relationship of circuit 60 to the remaining components of system 10 can, however, be easily seen in FIG. 2.

As an initial point in the discussion of the operation of the light-extinguishing circuit 60, FIG. 3 illustrates circuit 60 when the ignition switch 54 is open and the light switch 56 is closed. As will be appreciated, with ignition switch 54 open, current is prevented from flowing from the battery 18 to heating element 74 of the temperature-actuated switch 72 or to solenoid 80 of the switching relay 78. Because the solenoid 80 is deenergized, the normally open switch elements 82 and 84 of switching relay 78 are both in their open position and no current flows between terminals C and D of circuit 60 to the headlights 30, or between terminal E and F of circuit 60 to the taillights 40 and instrument lights 52.

Figure 5:
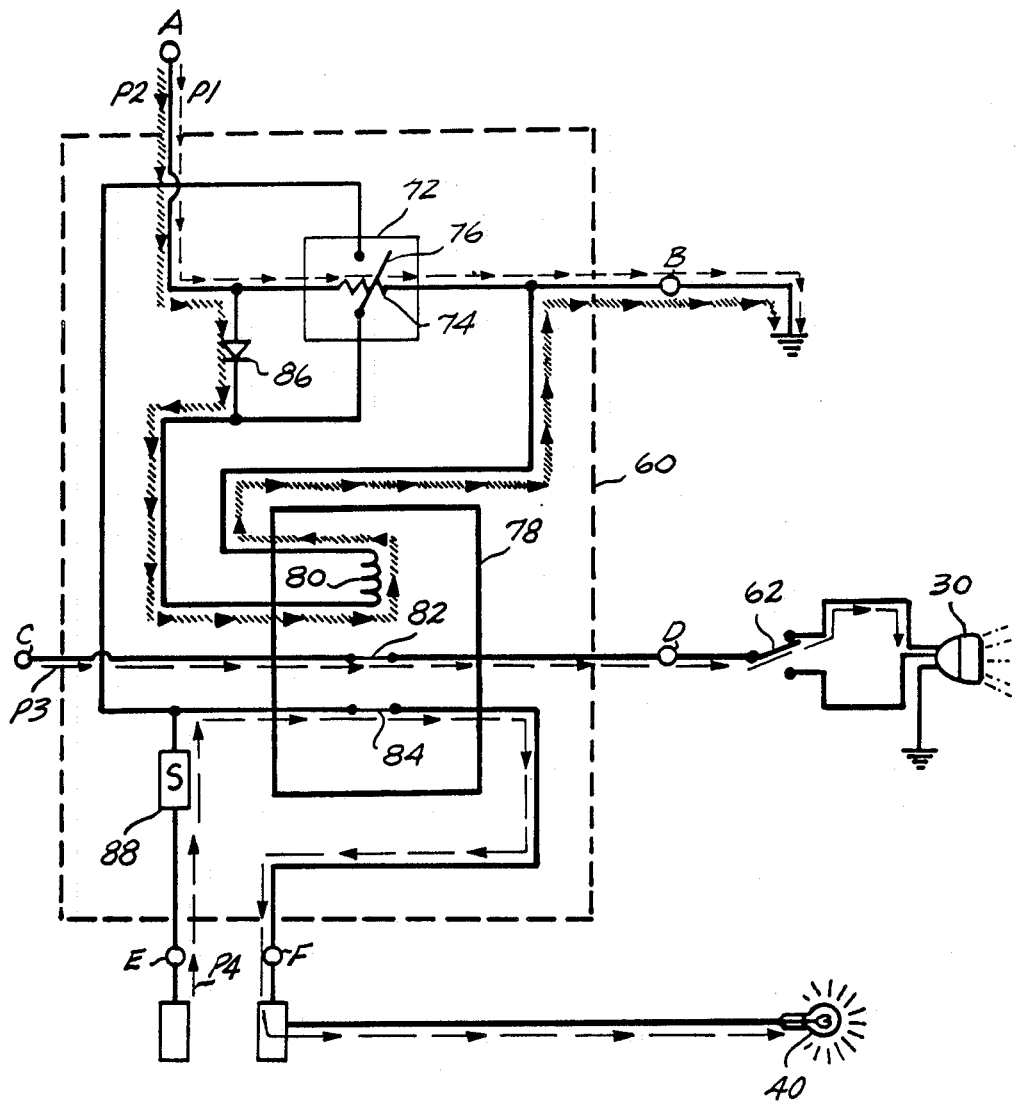
FIG. 5 is a schematic diagram of the circuit of FIG. 3 that graphically depicts the current paths defined by the circuit after the closure of the ignition switch and prior to the closure of a thermal delay switch included in the circuit.

Once the ignition switch 54 is closed, current flows through heating element 74 of temperature-actuated switch 72 to ground, as indicated by the broken line path P1 extending between terminals A and B of circuit 60 in FIG. 5. The diode 86, which is coupled between terminal A of circuit 60 and the ungrounded side of the switching solenoid 80, allows current from battery 18 and ignition switch 54 to flow through the solenoid 80, as indicated by the shaded path P2 also extending between terminals A and B of circuit 60.

With current flowing through solenoid 80, a magnetic field is established, closing the normally open switch elements 82 and 84 in switching relay 78. In this manner, a path P3 is completed between terminals C and D of light-extinguishing circuit 60 via switch element 82, allowing current from battery 18 to reach headlights 30. Similarly, switch element 84 completes a path P4 between terminals E and F of circuit 60, allowing current to flow to the taillights 40. Thus, with solenoid 80 energized, the light switch 56 can be used to selectively energize and deenergize headlights 30, taillights 40, and instrument lights 52.

As noted previously, with the ignition switch 54 closed, current flows through the heating element 74. Heating element 74 converts a portion of the electrical energy it receives into thermal energy, causing its temperature and that of the switch element 76 to increase. If the ignition switch 54 remains closed for some period of time $t_1$, whose magnitude depends upon, for example, the magnitude of the current flowing through heating element 74, the characteristics of the temperature-actuated switch 72, and the initial ambient temperature of switch 72, the temperature of heating element 74 will increase sufficiently to close the normally open switch element 76.

Figure 6:
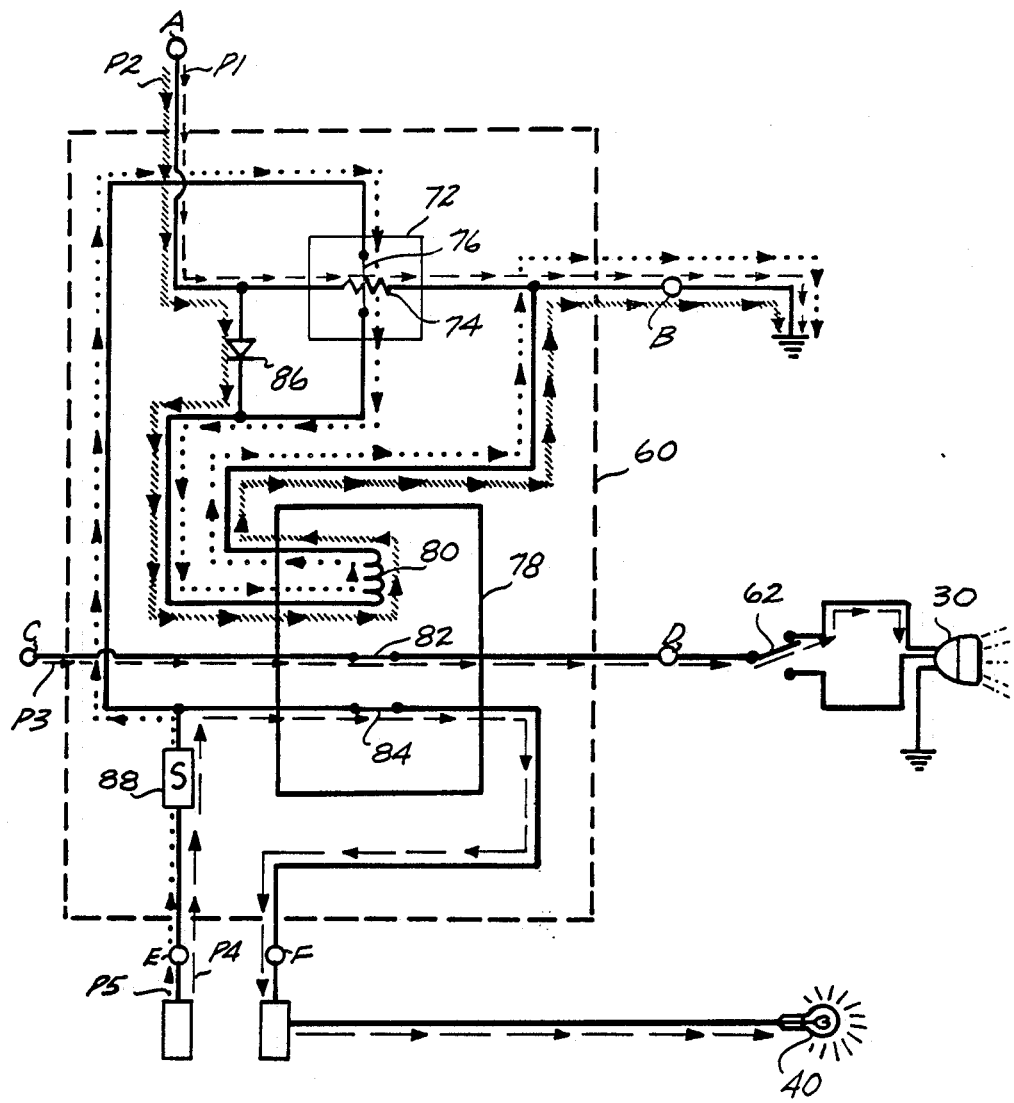
FIG. 6 is a schematic diagram of the circuit of FIG. 3, which graphically depicts the current paths defined by the circuit some time, $t_1$, after the closure of the ignition switch, with the thermal delay switch closed.
Figure 7:
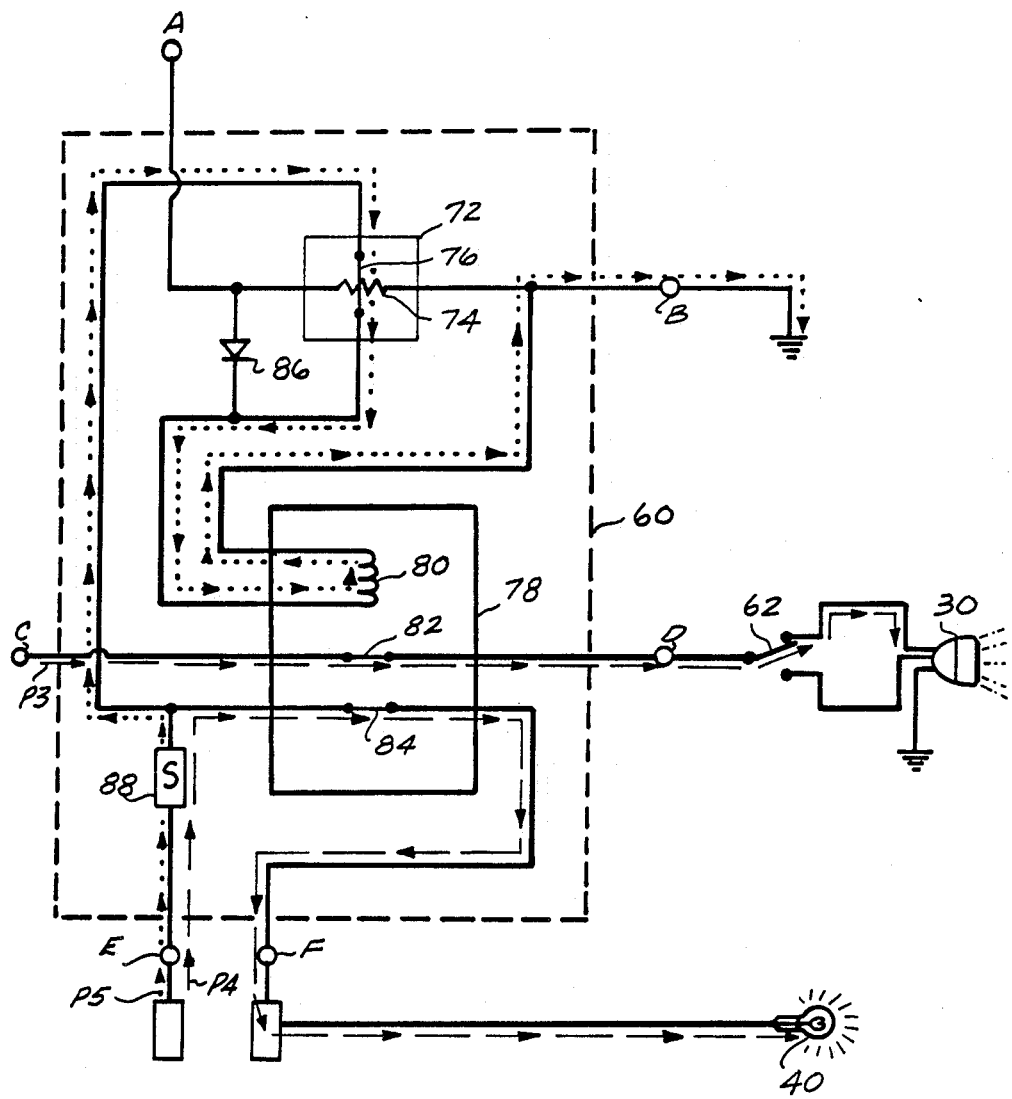
FIG. 7 is a schematic diagram of the circuit of FIG. 3, which graphically depicts the current paths defined by the circuit immediately after the ignition switch is opened, with a diode included in the circuit shown blocking a return path for current through the thermal delay.

At time $t_1$, the closing of switch element 76 completes the path P5 shown in FIG. 6, allowing current to flow from the power side of fuseblock 64 (terminal T1), through terminal E of circuit 60, fuse-and-holder assembly 88, switch element 76, switching relay solenoid 80, and terminal B of circuit 60 to ground. Because current also continues to flow through path P2 as illustrated in FIG. 6, the current flowing through path P5 alternatively maintains the solenoid 80 of switching relay 78 in an energized state and, hence, the switch elements 82 and 84 in their closed position. As a result, if the ignition switch 54 is subsequently opened, paths P1 and P2 will be interrupted and circuit 60 will be in the state shown in FIG. 7.

With the flow of current through paths P1 and P2 interrupted and diode 86 blocking the flow of current from path P5 to heating element 74, the heating element 74 of temperature-actuated switch 72 is no longer energized and heating element 74 and switch element 76 begin to cool. Until switch element 76 cools sufficiently to open, however, current will continue to flow along path P5, keeping the solenoid 80 energized and maintaining the switch elements 82 and 84 of switching relay 78 in their closed positions. As a result, current will continue to flow through paths P3 and P4 to headlights 30 and taillights 40, respectively.

In the event that the ignition switch 54 remains open for some period of time $t_2$ that is dependent upon, for example, the temperature of switch element 76 when ignition switch 54 is opened and the ambient temperature of temperature-actuated switch 72, the switch element 76 of the temperature-actuated switch 72 will cool sufficiently to return to its normally open state. As a result, the alternative current path P5 through solenoid 80 will be interrupted, causing the switch elements 82 and 84 of switching relay 78 to return to their normally open positions, extinguishing the headlights 30 and taillights 40. At this time, the circuit 60 is essentially restored to the condition shown in FIG. 3.

As will be appreciated from the preceding description of the operation of circuit 60, in the event that the light switch 56 is left in its closed position after the ignition switch 54 is opened, the headlights 30 and taillights 40 will be automatically extinguished some interval of time $t_2$ after the ignition switch 54 is opened. By extinguishing the lights, circuit 60 prevents the battery 18 from becoming so discharged as to be incapable of operating the starter motor 20 and ignition system 22. Thus, the operator will be able to start the engine 24 easily and conveniently upon return to the vehicle. In addition to preventing the unintentional discharge of battery 18, circuit 60 advantageously allows light switch 56 to be intentionally left closed when the ignition switch 54 is opened, so that headlights 30 and taillights 40 will illuminate an adjacent area, such as a garage, for an interval of time, allowing the vehicle operator to exit the vehicle.

A circuit 60 constructed in the preceding manner has a number of advantages. For example, circuit 60 is extremely simple, including essentially three elements: the temperature-actuated relay 72, switching relay 78, and diode 86. Given the particular interconnection of these components, however, this simplicity is not obtained at the expense of circuit operation. For example, circuit 60 allows the various components 16 to be energized immediately upon closure of ignition switch 54 and automatically extinguished some interval of time after the ignition switch 54 is opened. The diode 86 enables relay 78 to provide energy to components 16 immediately and assures the operation of the components 16 in the event that the control switch 76 of switching relay 78 fails in the open position. The diode 86 then restricts the continued flow of current to heating element 74 upon opening of the ignition switch 54, allowing the circuit 60 to effect the desired time-delayed extinguishment of the components 16.

The particular construction employed for circuit 60 further does not necessitate the interruption of current to the components 16 upon actuation of the temperature-actuated switch 72. Thus, the contact life of switch 72 is presumably increased. In addition, because the current to components 16 is interrupted by the switching relay 78 rather than temperature-actuated switch 72, the switch 72 need not be designed to carry continuous currents of the type provided to components 16. Each of these aspects of circuit 60 makes it an economical device to incorporate into system 10.

The preceding circuit 60 also has the advantage of being extremely easy to connect into a wide variety of existing vehicle electrical systems 10. Specifically, only six connections are required; including one to the ignition switch, one to ground, two to the dimmer powerline, and two to the fuseblock. It has been found that these connection points are among the most easily accessible on a large proportion of production vehicle electrical systems, thus simplifying the connection of circuit 60 to system 10.

In addition, in the arrangement shown in FIG. 4, the fuseblock 64 connection (i.e., terminals E and F) has been simplified by employing a dummy fuse insert 94 for insertion into the vacancy left by the removal of fuse F1 from fuseblock 64. The insert 94 includes a nonconductive body 98 and a pair of terminals 100, which are coupled to the remainder of circuit 60 by two of the connection wires 92. As will be appreciated, insert 94 can be formed from an existing fuse, wherein the fuse element extending between terminals 100 has been open-circuited and wires 92 have been electrically connected to terminals 100. The insert 94 electrically connects fuseblock terminal T1 to circuit terminal E and fuseblock terminal T2 to circuit terminal F.

The remaining connections or circuit 60 to system 10 are formed via wire wraps or by soldering. Further, as shown in the preferred embodiment of FIG. 4, a pair of plastic tie wraps 96, of the type that allow one end to be passed through an opening in the other and secured upon being drawn closed, can be conveniently used to secure the assembled circuit 60 to, for example, a wire harness located under the dashboard of the vehicle.

Those skilled in the art will recognize that the embodiments of the invention disclosed herein are exemplary in nature and that various changes can be made therein without departing from the scope and the spirit of the invention. For example, in the arrangement shown in FIGS. 2 through 7, terminals E and F of the automatic light-extinguishing circuit 60 are coupled to the portions of fuseblock 64 that protect the taillights 40 and instrument lights 52. As will be readily appreciated, however, circuit 60 could easily be connected to another section of fuseblock 64 to similarly control the flow of current to devices such as compartment lights 54, telephones, and citizen band radios. This could be accomplished, for example, by providing enough switch elements in switching relay 78 to interrupt each circuit desired or, alternatively, by employing separate switching relays 78 for each circuit. As a related point, although separate fuses F1, F2, and F3 are employed to protect the parking lights 42 and 46 and license plate light 50, the brakelights 44 and 48, and the instrument lights 52, respectively, in the arrangement illustrated in FIG. 2, in many automobile electrical systems 10 all of these lights are protected by a single fuse. In that case, the single switch 84 of relay 78 can be used to automatically interrupt the flow of current to lights 42, 44, 46, 48, 50 and 52. Finally, as will be readily appreciated, a time-delay relay could be employed in place of diode 86 and temperature-actuated switch 72 to effect the delayed operation of relay 78 and, hence, extinguishing of headlights 30. Because of the above, and numerous other variations and modifications that will occur to those skilled in the art, the following claims should not be limited to the embodiments illustrated and disclosed herein.

The embodiments of the invention in which an exclusive property or privilege is claimed are defined as follows:

1. A circuit, for use in a vehicle that includes a source of electric energy, electric components, and an ignition switch, comprising:
   a control switch, including a heating element and a control switch element, said heating element being connectable to the ignition switch;
   a diode; and
   a first relay, including a first solenoid and a first power switch element, said first solenoid being connectable to the ignition switch by said diode and to the source of electric energy by said control switch element, said first power switch element being connectable between the source of electric energy and the electric components, said first solenoid being energizable to operate said first power switch element and control the supply of energy to the electric components, said heating element being energizable to operate said control switch element.

2. The circuit of claim 1, wherein the electric components include first and second groups of electric components and said relay includes a relay power switch element, said first power switch element being connectable between the source of electric energy and the first group of electric components, said relay power switch element being connectable between the source of electric energy and the second group of electric components.

3. The circuit of claim 1, wherein the electric components include first and second groups of electric components and said first power switch element is connectable between the source of electric energy and the first group of electric components.

4. The circuit of claim 3, further comprising a second relay, including a second solenoid and a second power switch element, said second solenoid being connectable to the ignition switch by said diode and to the source of electric energy by said control switch element, said second power switch element being connectable between the source of electric energy and the second group of electric components, said second solenoid being energizable to operate said second power switch element and control the supply of energy to the second group of electric components.

5. A circuit for use in a vehicle that includes a source of electric energy coupled to an electric ground, a dimmer power wire coupled to headlights, a fuseblock with fuse-receiving means, an auxiliary electric device, and an ignition switch, said circuit being for connecting the headlights and auxiliary electric device to the source when the ignition switch is closed and for automatically disconnecting the headlights and auxiliary electric device from the source an interval of time after the ignition switch is opened, said circuit comprising:
   a control switch, including a heating element and a control switch element that is responsive to the temperature of said heating element;
   a diode; and
   a relay, including a solenoid and a first power switch element that is responsive to said solenoid, said heating element and said diode being connected to define a first point that is connectable to the ignition switch; said heating element and said solenoid being connected to define a second point that is connectable to ground; said diode and said solenoid being connected; said first power switch element defining third and fourth points that are connectable into the dimmer power wire; said control switch element being connected to said solenoid and diode and defining a fifth point connectable to the fuse-receiving means.

6. The circuit of claim 5, wherein said relay further includes a second power switch element responsive to said solenoid and cooperatively defining said fifth point and a sixth point, both connectable to the fuse-receiving means.

7. The circuit of claim 6, further comprising means for electrically coupling said fifth and sixth points to said fuse-receiving means.

8. The circuit of claim 7, wherein said means for electrically coupling said fifth and sixth points comprises a fuse insert.

* * * * *